L. W. LEEDS.
Steam Heater.

No. 23,096.   Patented March 1, 1859.

UNITED STATES PATENT OFFICE.

LEWIS W. LEEDS, OF NEW YORK, N. Y.

APPARATUS FOR HEATING BUILDINGS.

Specification of Letters Patent No. 23,096, dated March 1, 1859.

*To all whom it may concern:*

Be it known that I, LEWIS W. LEEDS, of the city, county, and State of New York, have invented a new and useful Improvement in Apparatus for Heating Buildings; and I do hereby declare that the following is a full, clear, and exact description of the same, reference being had to the accompanying drawings, forming part of this specification, in which—

Figure 1:
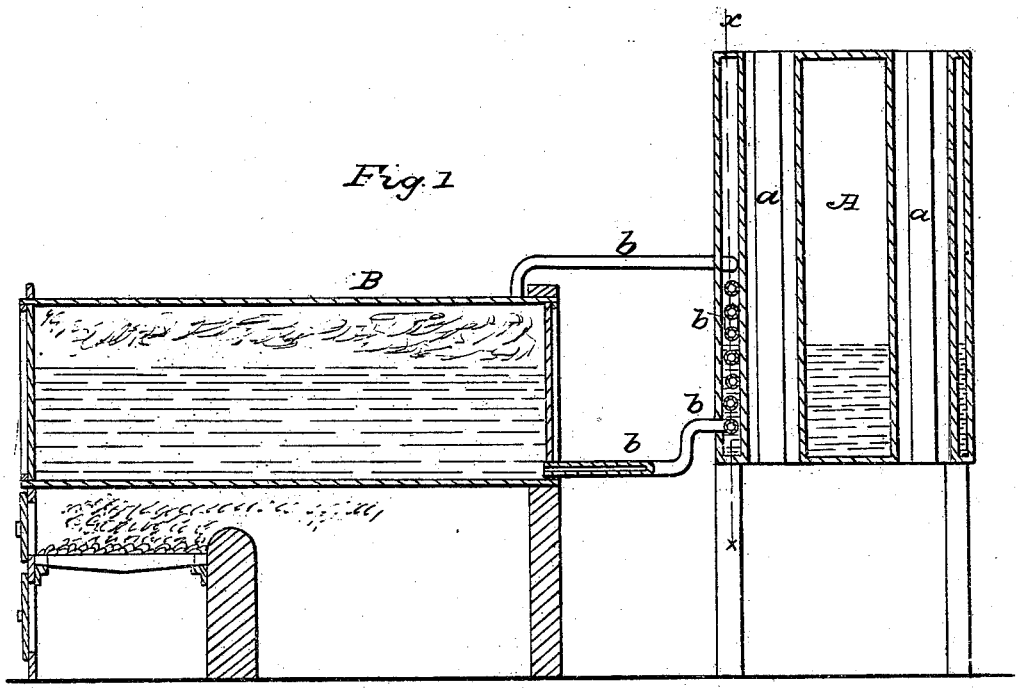
Figure 2:
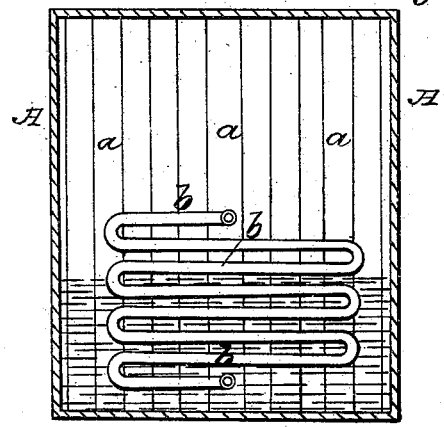

Figure 1 is a vertical section of a heating apparatus illustrating the simplest form of my invention. Fig. 2 is a vertical section at right angles to Fig. 1, in the plane indicated by the line X, X.

Similar letters of reference indicate corresponding parts in both figures.

The object of my invention is to combine all the advantages of heating by hot water and those of heating by steam while getting rid of the disadvantages of both.

Before explaining the nature of my invention I will as briefly as possible state the advantages and disadvantages of the two above mentioned methods of heating when employed separately.

The advantages of heating by hot water, which I retain, are 1st; that it permits the heating surfaces to be kept at a uniform temperature at any desirable degree below 212° F, so that the temperature of the air may be regulated to suit mild weather; 2nd: that as water contains several hundred times as great a quantity of heat in the same space as steam the heating surfaces heated by it are not so soon affected by any sudden variation in the fire or source of heat, or the fluctuation of the current of cold air passing over them; 3rd: that it is entirely free from any danger from explosion of the apparatus employed; 4th: the apparatus employed can never become hot enough to set wood work on fire.

The disadvantages, which I avoid, are 1st; that the motive power for creating the circulation in a hot water apparatus is so small in proportion to the body of water to be set in motion that the circulation is so sluggish that it fails in cold weather if the water is to be carried far from the fire; 2nd: that the hot water apparatus requires a long time to become heated after it has been allowed to get cold.

The principal advantages to be derived from the use of steam for heating, which I retain, are 1st: the extreme rapidity with which it can be conducted a long distance in small pipes which gives it the power of extending over and heating a very large surface almost instantaneously; 2nd: that it is very effective in heating water.

The disadvantages which I get rid of are 1st: that it has no temperature below 212° F. which makes it inconvenient for mild weather; 2nd: that the whole of the heating apparatus in which it is employed has to be made of considerable strength which makes it costly; 3rd: that when more than a very low pressure of steam is used the apparatus is in constant danger of explosion. and when a low pressure is used the range of temperature is so small it is not adapted to meet the great variations of the temperature of the external atmosphere and fire requires to be so very perfectly regulated, as the least excess of combustion causes a waste by the escape of steam and the least deficiency allows all the steam to condense leaving the apparatus entirely cold.

With a view to combine all the advantages and get rid of all the disadvantages above specified my invention consists in placing one or more vessels of water, of any convenient form to present the desired heating surface, in the cellar, basement or any other part or parts of the building to be heated, where it may be convenient to heat the air for circulation through the building, and heating the water in the said vessels through the agency of steam generated in a separate boiler which may be placed at any convenient distance and where its explosion would not be attended with danger.

In the apparatus represented in the drawings, only one water vessel A, is represented as that is sufficient for illustration, but in a building of any considerable size I propose to use a number of these vessels, arranged as may be most convenient or desirable, generally one directly under each of a series of air flues for conveying the heated air to different points or apartments of the building. The said vessels may be of any form and contain any arrangement of air heating tubes $a$, $a$, of any form, as may be considered best adapted to present the most effective heating surface. The boiler B, may be placed outside of, or in any convenient place within the building. The steam pipe $b$, is represented as being arranged in a serpentine form within the water vessel A, and with a return for conveying back the water of condensation to the boiler, but it may have the form of a coil or be arranged in any other way within the water vessel; and it might discharge its steam directly into the water vessel, but I consider it better for several reasons to have a return to the boiler for the water of condensation.

I do not claim broadly the use of steam as as agent for heating water but

What I claim as my invention and desire to secure by Letters Patent is—

Combining the uses of steam and water for heating buildings, by means of one or more water vessels combined with a separate steam boiler and applied in such manner that the steam from the said boiler is employed only to heat the water in the said water vessel or vessels, and that the said water vessels or vessels constitute the heater or heaters of the air as herein described.

LEWIS W. LEEDS.

Witnesses:
  Wm. Tusch,
  W. Hauff.